United States Patent [19]

Kanota

[11] Patent Number: 5,212,600
[45] Date of Patent: May 18, 1993

[54] DIGITAL VIDEO TAPE RECORDER WITH TIME BASE CORRECTION OF INPUT VIDEO SIGNALS

[75] Inventor: Keiji Kanota, Kanagawa, Japan
[73] Assignee: Sony Corporation, Tokyo, Japan
[21] Appl. No.: 631,096
[22] Filed: Dec. 19, 1990

[30] Foreign Application Priority Data

Dec. 29, 1989 [JP] Japan ................................. 1-341967

[51] Int. Cl.⁵ .............................................. H04N 5/78
[52] U.S. Cl. .................................... 360/36.2; 360/32; 358/339
[58] Field of Search ........................ 360/32, 36.1, 36.2, 360/33.1, 14.2, 10.1, 10.3; 358/310, 320, 337, 339

[56] References Cited

U.S. PATENT DOCUMENTS

| | | | |
|---|---|---|---|
| 4,724,491 | 2/1988 | Lambert | 360/14.1 X |
| 4,761,691 | 8/1988 | Stearns | 358/311 |
| 4,764,812 | 8/1988 | Hamley | 360/36.1 X |
| 4,870,509 | 9/1989 | Nagasawa et al. | 360/36.1 X |

FOREIGN PATENT DOCUMENTS 2061665  5/1981  United Kingdom ................. 371/31

OTHER PUBLICATIONS

Peta Utz, Video User's Handbook, 1980 pp. 260, 321-333 Prentice-Hall, Inc.

Primary Examiner—Andrew L. Sniezek
Attorney, Agent, or Firm—William S. Frommer; Alvin Sinderbrand

[57] ABSTRACT

A digital video tape recorder for digitally recording and/or reproducing a video signal. An analog video signal is received and converted to a digital signal which is supplied to a time base corrector for correcting a time base error in the input video signal by writing the digital signal into a memory in response to a synchronizing signal derived from the input video signal and reading out the stored digital signal from the memory in response to a reference signal. The output signal of the timebase corrector is processed and recorded on a magnetic tape by a rotary head.

1 Claim, 1 Drawing Sheet

DIGITAL VIDEO TAPE RECORDER WITH TIME BASE CORRECTION OF INPUT VIDEO SIGNALS

BACKGROUND OF THE INVENTION

1. Field of the Invention

The present invention relates generally to video tape recorders and, more particularly, is directed to a digital video tape recorder utilizing, a reproducing rotary head.

2. Description of the Prior Art

In the prior art, a video tape recorder (VTR) records and reproduces an analog video signal. Recently, however, a digital video tape recorder has been developed primarily for consumer use, in which a received analog video signal is recorded and reproduced in the form of a digital signal.

A video signal reproduced from an 8-mm or ½ inch cassette type video tape recorder may be subsequently recorded or dubbed by use of a digital VTR. When such recording is performed, it is frequently observed that the phase of a synchronizing signal of the reproduced signal from the cassette type video tape recorder deviates from the reference phase of a synchronizing signal of a standard reproduced signal. If the signal having such deviated phase is then recorded by the digital video tape recorder, a disturbance will occur in the conversion of the analog signal to the digital signal. As a result, the signal cannot be directly recorded by the digital VTR.

On the other hand, in a broadcasting station or the like, the analog signal reproduced from a non-digital type VTR is supplied to a time base correcting apparatus to compensate for phase deviation or the like. The compensated signal is then supplied to a digital VTR so as to be recorded and reproduced therein. The digital VTR includes a time base correcting circuit for correcting the time base of the digital signal reproduced therefrom. Thus, in the prior art, prior to supplying an analog signal reproduced from a non-digital type VTR to a digital VTR, the reproduced analog signal is supplied to a time base correcting apparatus. However, in the prior art, manufacturing a time base correcting apparatus primarily intended for consumer use is not cost effective as the usage or demand for such an apparatus is very limited.

OBJECTS AND SUMMARY OF THE INVENTION

Accordingly, it is an object of the present invention to provide an improved digital video tape recorder which can substantially eliminate the aforenoted shortcomings and disadvantages encountered with the prior art.

More specifically, it is an object of the present invention to provide a digital video tape recorder for recording an input digital video signal in which the phase of the corresponding synchronizing signal is different from that of a standard digital video signal.

Another object of the present invention is to provide a digital video tape recorder as aforementioned which can be fabricated at a relatively low cost.

It is yet a further object of the present invention to provide a digital video tape recorder as aforementioned which has a relatively high efficiency.

According to an aspect of the present invention, a digital video tape recording and/or reproducing apparatus comprising an anlong-to-digital converter for converting an input video signal into a corresponding digital video signal, a time base corrector for correcting a time base error in the input video signal including a memory, a device for writing the digital video signal in the memory in response to a synchronizing signal derived from the input video signal, a device for generating a reference signal and a device for reading out the digital video signal from the memory in response to the reference signal, circuit for processing the digital video signal read from the memory of the time base corrector, and a device including a rotary head for recording the processed digital video signal on a magnetic tape.

The above, and other objects, features and advantages of the present invention will become apparent from the following detailed description of an illustrative embodiment when read in conjunction with the accompanying drawing.

DETAILED DESCRIPTION OF THE PREFERRED EMBODIMENT

Figure 1:
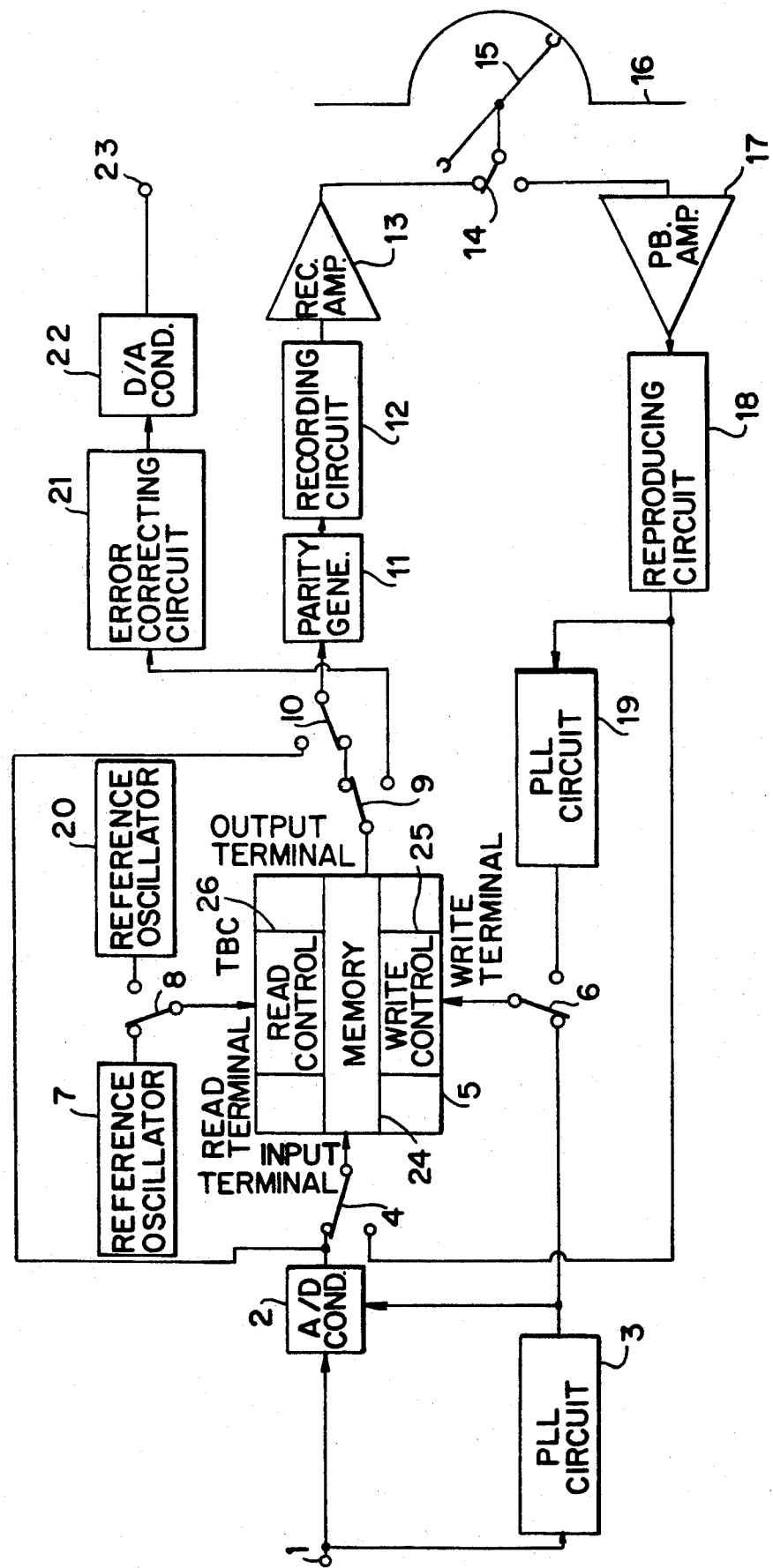
FIG. 1 is a schematic block diagram showing a digital video tape recording and/or reproducing apparatus according to an embodiment of the present invention.

A digital video tape recording and/or reproducing apparatus according to an embodiment of the present invention will be hereinafter described with reference to FIG. 1.

As shown in FIG. 1, an input analog video signal is supplied through an input terminal 1 to an analog-to-digital (A/D) converter 2 and a phase-locked loop (PLL) circuit 3. PLL circuit 3 generates a clock signal synchronized with the video input signal, and which is supplied to the A/D converter 2 to convert the video input signal into a corresponding digital video signal.

The digital video signal from converter 2 is supplied through a recording and reproducing change-over switch 4 to the input terminal of a time base correcting (TBC) circuit 5. Simultaneously, the clock signal synchronized with the input video signal, which is derived from the PLL circuit 3, is further supplied through a recording and reproducing change-over switch 6 to the write clock input terminal of the TBC 5 as a write clock signal. As a result, the digital video signal is written into a memory 24 included within the TBC 5 in response to the write clock signal. Writing into memory 24 is controlled by write control circuit 25.

A reference oscillator 7 is provided for use with a recording system. More specifically, a clock signal generated from the reference oscillator 7 is supplied through a recording and reproducing change-over switch 8 to the read clock input terminal of the TBC 5, as a result, the TBC 5 derives at its output terminal a timebase-corrected digital signal which is synchronized with the clock signal from the reference oscillator 7. Reading from memory 24 is controlled by read control circuit 26.

The timebase-corrected digital signal from the TBC 5 is supplied through a recording and reproducing change-over switch 9 and a by-pass switch 10 to an error correction parity generating circuit 11, in which a parity code is generated and added to the digital signal. The digital signal including the parity code is supplied to a recording circuit 12 which generates a recording signal by using a predetermined modulation or the like. This recording signal is supplied through a recording amplifier 13 and a recording and reproducing changeover switch 14 to a rotary head 15, by which the recording signal is recorded on a tape 16.

As described above, the input video signal supplied to the input analog terminal 1 is converted into a corresponding digital signal, time base corrected, and recorded on the tape 16 by using the rotary head 15. On the other hand, the reproduction of the digital signal from the tape 16 is performed as described hereinafter.

During reproduction, the switches 4, 6, 8, 9 and 14 are switched to the respective contacts which are opposite to those shown engaged in FIG. 1. With the switches thus engaged, the signal reproduced from the tape 16 by the rotary head 15 is supplied through the switch 14 and a reproducing amplifier 17 to a reproducing circuit 18, whereupon the digital signal is reproduced by demodulation or the like which corresponds to the modulation or the like performed by the above-described recording circuit 12. The reproduced digital signal from circuit 18 is supplied through switch 4 to the input terminal of the TBC 5 and to a PLL circuit 19 which, in turn, generates a clock signal synchronized with the reproduced digital signal. This clock signal is supplied through switch 6 to the write clock input terminal of the TBC 5.

A reference oscillator 20 is provided for the reproducing system. More specifically, the clock signal generated from the reference oscillator 20 is supplied through switch 8 to the read clock input terminal of the TBC 5. As a result the TBC 5 derives at its output terminal the timebase-corrected reproduced digital signal which is synchronized with the clock signal generated from the reference oscillator 20.

The timebase-corrected reproduced digital signal from the TBC 5 is supplied through switch 9 to an error correction circuit 21, so as to perform error correction by using the parity code added to the digital signal as previously described in the above recording system. The error corrected reproduced digital signal from circuit 21 is supplied to a digital-to-analog (D/A) converter 22, from which an analog video signal is supplied to an output terminal 23.

As described above, the analog video input signal supplied to the input terminal 1 is converted into a corresponding digital signal, time base corrected and recorded on and reproduced from the tape 16 by the rotary head 15. The reproduced digital signal is time base and error corrected and converted into the analog video signal which is fed to the output terminal 23.

Thus, according to the above described embodiment of the present invention, the input video signal is supplied to the time base correcting circuit 5, so as to be timebase-corrected, and is then recorded. The same time base correcting circuit can be used for the reproducing system. Therefore, non-standard input video signals can be digitally recorded by using the present video tape recording and/or reproducing apparatus which, in turn, has a relatively simple construction.

Further, in the above-described embodiment, if the input video signal is a standard signal as, for example, in the case of a reception signal from standard broadcasting waves or the like, the input video signal need not be time base corrected prior to the recording of such signal. Accordingly, in this situation, the time base correcting circuit 5 is by-passed by the switch 10 so as not to perform unnecessary processing, thus increasing the operating performance and efficiency of the present apparatus.

Therefore, according to the above-described embodiment of the present invention, a standard or non-standard video input signal can be accurately digitally recorded. Further, the present digital VTR can operate with relatively high efficiency and can be fabricated at a relatively low cost.

Although a preferred embodiment of the present invention has been described in detail herein with reference to the accompanying drawing, it is to be understood that the invention is not limited to that precise embodiment, and that various changes and modifications could be effected therein by one skilled in the art without departing from the spirit or scope of the invention as defined in the appended claims.

I claim as my invention:

1. A digital video tape recording and reproducing apparatus, comprising:

analog-to-digital converter means for converting an input video signal into a corresponding digital video signal;

time base corrector means for correcting a time base error in said input video signal including a memory, means for writing said digital video signal in said memory in response to a first synchronizing signal derived from said input video signal, means for generating a first reference signal and means for reading out a time base corrected digital video signal from said memory in response to said first reference signal;

means for processing the time base corrected digital video signal read from said memory and for supplying a recordable time base corrected digital video signal;

means including a rotary head for recording the recordable time base corrected digital video signal on a magnetic tape;

means including said rotary head for reproducing the digital video signal recorded on said magnetic tape;

means for writing said reproduced digital video signal in said memory in response to a second synchronizing signal derived from said reproduced digital video signal;

means for generating a second reference signal;

means for reading out the reproduced digital video signal from said memory as a time base corrected reproduced digital video signal in response to said second reference signal; and digital-to-analog converter means for converting the time base corrected reproduced digital video signal read from said memory into an analog output video signal.

* * * * *